(12) United States Patent
Parulski et al.

(10) Patent No.: US 6,366,316 B1
(45) Date of Patent: Apr. 2, 2002

(54) ELECTRONIC IMAGING SYSTEM FOR GENERATING A COMPOSITE IMAGE USING THE DIFFERENCE OF TWO IMAGES

(75) Inventors: Kenneth A. Parulski; Jiebo Luo; Edward B. Gindele, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/228,903

(22) Filed: Jan. 11, 1999

Related U.S. Application Data

(63) Continuation of application No. 08/697,801, filed on Aug. 30, 1996, now Pat. No. 5,914,748.

(51) Int. Cl.[7] .......................... H04N 5/262; H04N 9/74
(52) U.S. Cl. ...................... 348/239; 348/232; 348/552; 348/586; 396/3; 345/634
(58) Field of Search ...................... 396/2, 3; 348/207, 348/222, 223, 224, 231–233, 239, 241, 250, 584, 585, 586, 589, 590, 552; 345/629, 630, 634, 636, 637; 352/44, 48; H04N 5/262, 9/74

(56) References Cited

U.S. PATENT DOCUMENTS

| | | | | |
|---|---|---|---|---|
| 4,109,278 A | * | 8/1978 | Mendrala | 348/587 |
| 4,968,132 A | * | 11/1990 | Ferren | 352/46 |
| 5,117,283 A | * | 5/1992 | Kroos | 348/564 |
| 5,196,922 A | * | 3/1993 | Yeomans | 348/578 |
| 5,262,856 A | * | 11/1993 | Lippman | 348/469 |
| 5,479,351 A | * | 12/1995 | Woo | 348/515 |
| 5,577,179 A | * | 11/1996 | Blank | 345/435 |
| 5,787,199 A | * | 7/1998 | Lee | 382/203 |
| 6,018,774 A | * | 1/2000 | Mayle | 709/250 |

* cited by examiner

Primary Examiner—Wendy R. Garber
Assistant Examiner—Ngoc-Yen Vu
(74) Attorney, Agent, or Firm—Pamela R. Crocker (57) ABSTRACT

An electronic imaging system includes a portable electronic camera operable in a compositing mode and a separate processor for compositing images using the difference of two images.

9 Claims, 7 Drawing Sheets

ELECTRONIC IMAGING SYSTEM FOR GENERATING A COMPOSITE IMAGE USING THE DIFFERENCE OF TWO IMAGES

CROSS-REFERENCE TO RELATED APPLICATIONS

This is a continuation of application Ser. No. 08/697,801, filed Aug. 30, 1996, now U.S. Pat. No. 5,914,748.

FIELD OF THE INVENTION

The invention relates generally to the field of photography, and in particular to the manipulation of multiple images in an electronic imaging system. More specifically, the invention relates to a compositing technique for inserting a subject into a different background.

BACKGROUND OF THE INVENTION

Known digital imaging systems allow a user to extract people or objects from a scene, and composite them in front of a different, "fun" background, such as a Las Vegas skyline or an image of the moon. In the past, two methods have been used to accomplish this result: (1) A special uniformly colored screen or bright background is used behind the people/objects of interest, and a foreground mask is created using a "linear blue screen" method or "chroma key" method. An example of this method is described in U.S. Pat. No. 5,424,781. This method can give excellent results, but requires that the user have an expensive, carefully lit, colored background. (2) The people/objects of interest may be captured in front of any type of background, and then "cuty" out of the background electronically using software tools available in such software packages as Adobe Photoshop™ version 3.0, for example. Unfortunately, for most subjects such as people, use of such software tools is a time-consuming and difficult process that typically yields a less than realistic looking border around the image.

What is required is a method of extracting people/objects of interest that can quickly and easily be accomplished by inexperienced users, and hat gives acceptable results, without requiring a special colored background.

SUMMARY OF THE INVENTION

The present invention is directed to overcoming one or more of the problems set forth above. Briefly summarized, according to one aspect of the present invention, an electronic imaging system useful for compositing images includes an electronic camera for capturing multiple images, including a first image of a subject plus background and a second image of the background only; means for subtracting the first and second images to generate a difference image; means for processing the difference image to generate a mask image; and means for applying the mask image to the first image to select an area in which the subject is located, whereby the selected subject area is used in the compositing of a new image.

By taking a first picture of people and/or objects in front of any type of background (rather than using a specially colored background), followed by a second picture after the people/objects are removed, a system is obtained which provides quick and easy results, even by inexperienced users. The second image is subtracted from the first, and the result is automatically processed in order to create a foreground "mask" that is used to extract just the people/objects, can then be composited into any desired background.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems employing electronic sensors and host computers are well known, the present description will be directed in particular to elements forming part of, or cooperating more directly with, apparatus in with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
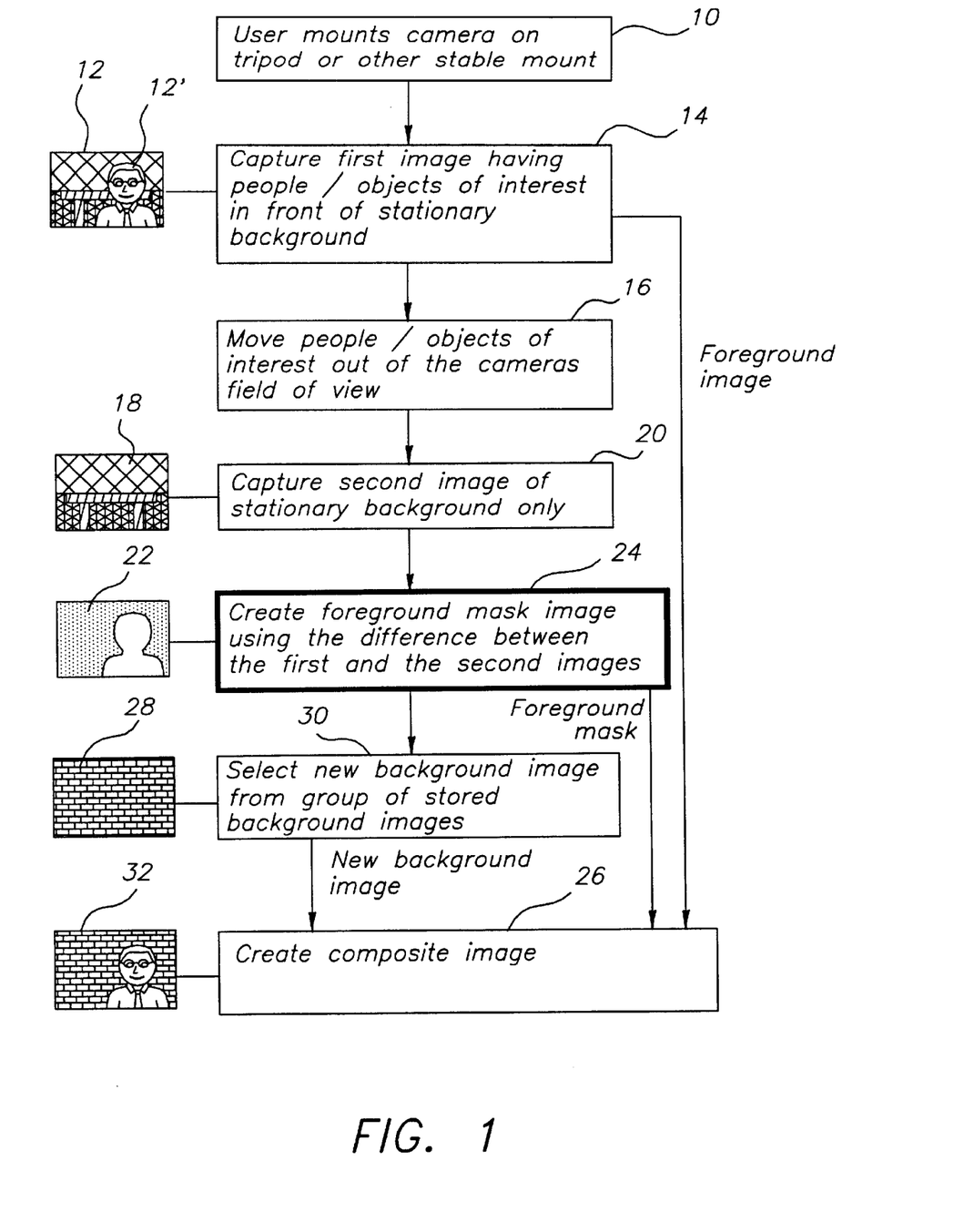
FIG. 1 is a diagram of a system for generating a composite image according to the invention.
Figure 2:
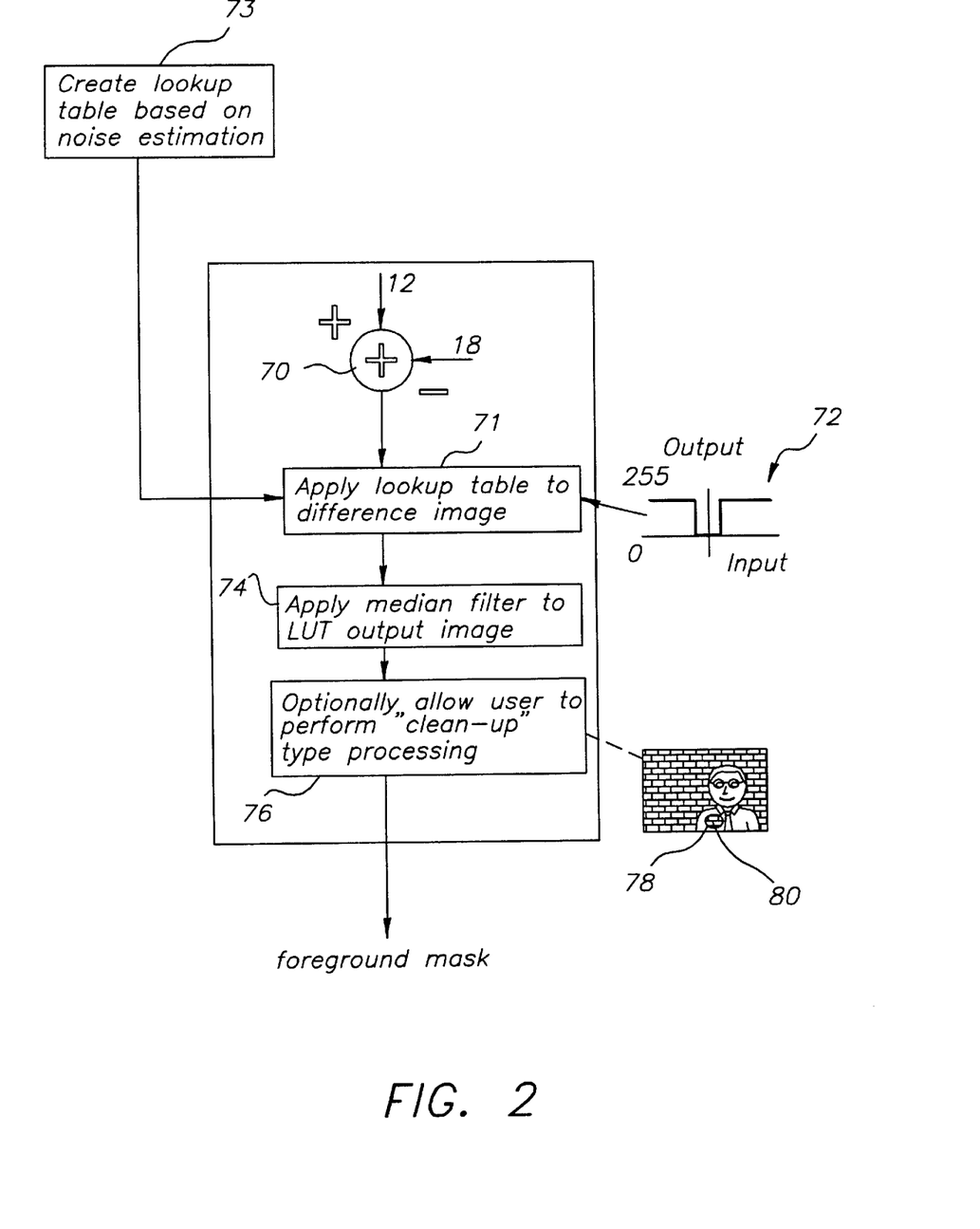
FIG. 2 shows a preferred technique for the foreground mask step shown in the diagram of FIG. 1.

A diagram of the process of generating a composite image according to the invention is shown in FIG. 1. With the camera firmly mounted on a tripod (step 10), a first image 12 of a subject plus background is captured (step 14). The subject is moved out of the field of view of the camera (step 16) and a second image 18 of the background only is captured (step 20). A mask 22 is generated in a foreground mask generation step 24 based on the difference between the first and second images 12,18. The foreground mask 22 is used to extract a foreground image 12' from the first image 12 in a compositing step 26, wherein a new background 28 selected from a group of stored background images (step 30) is combined with the extracted foreground to provide a composite image 32 with the new background. A preferred technique for the foreground mask generation step 24 is shown in FIG. 2. This technique can be applied either to a tethered digital camera 40 as shown in FIG. 3A, or to a portable digital camera 42 incorporating a removable memory, as shown in FIG. 4A.

Figure 3A:
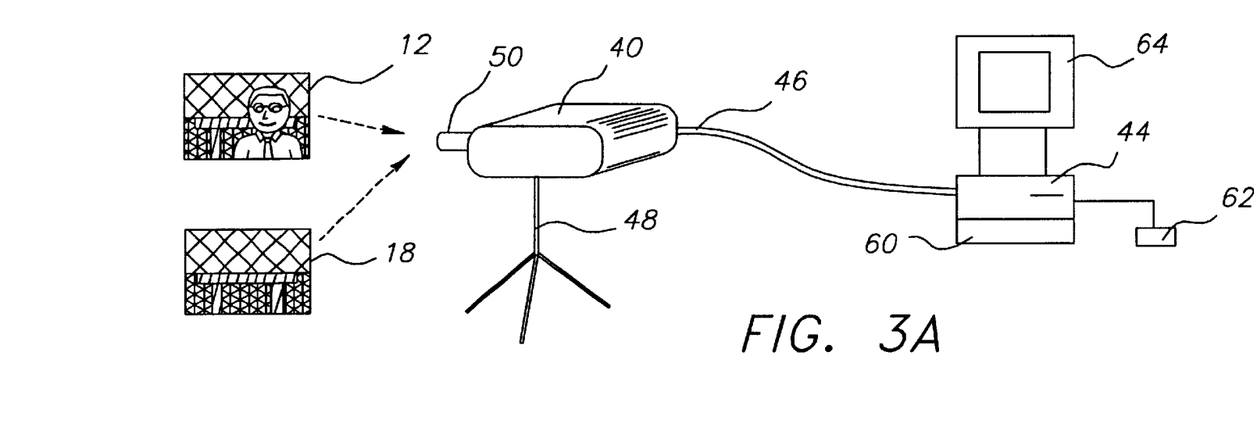
FIGS. 3A and 3B show a digital camera tethered to a computer and a block diagram of a camera circuit for the tethered camera, both useful with the system of FIG. 1.
Figure 3B:
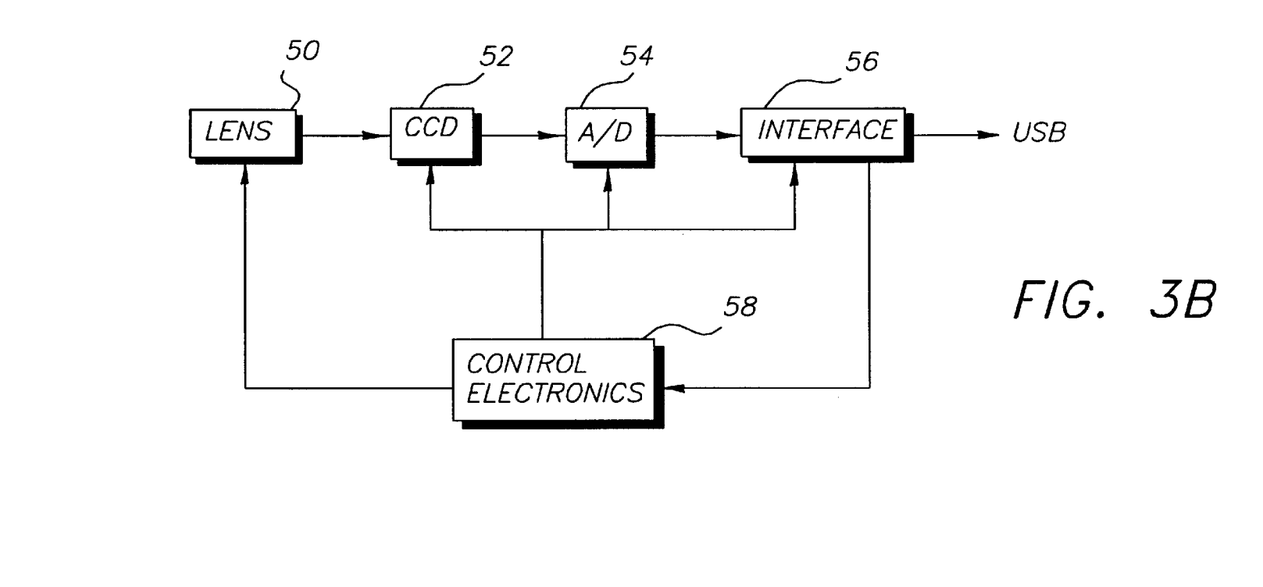
Figure 4A:
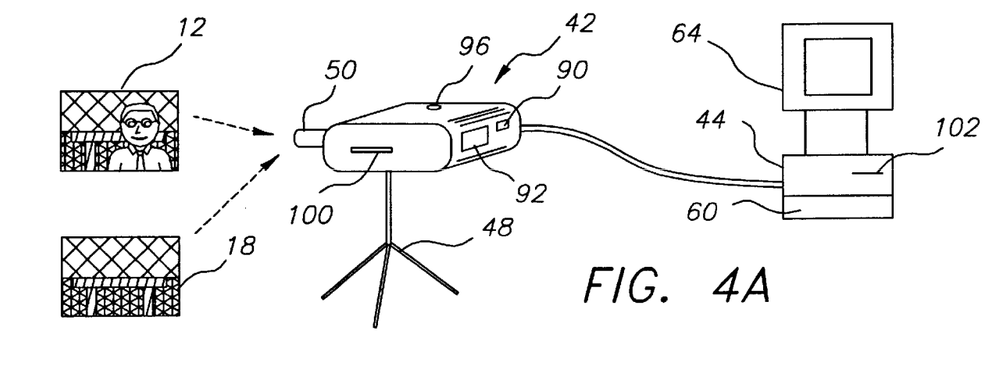
FIGS. 4A and 4B show a portable digital camera with removable and a block diagram of a camera circuit for the portable digital camera, both useful with the system of FIG. 1.
Figure 4B:
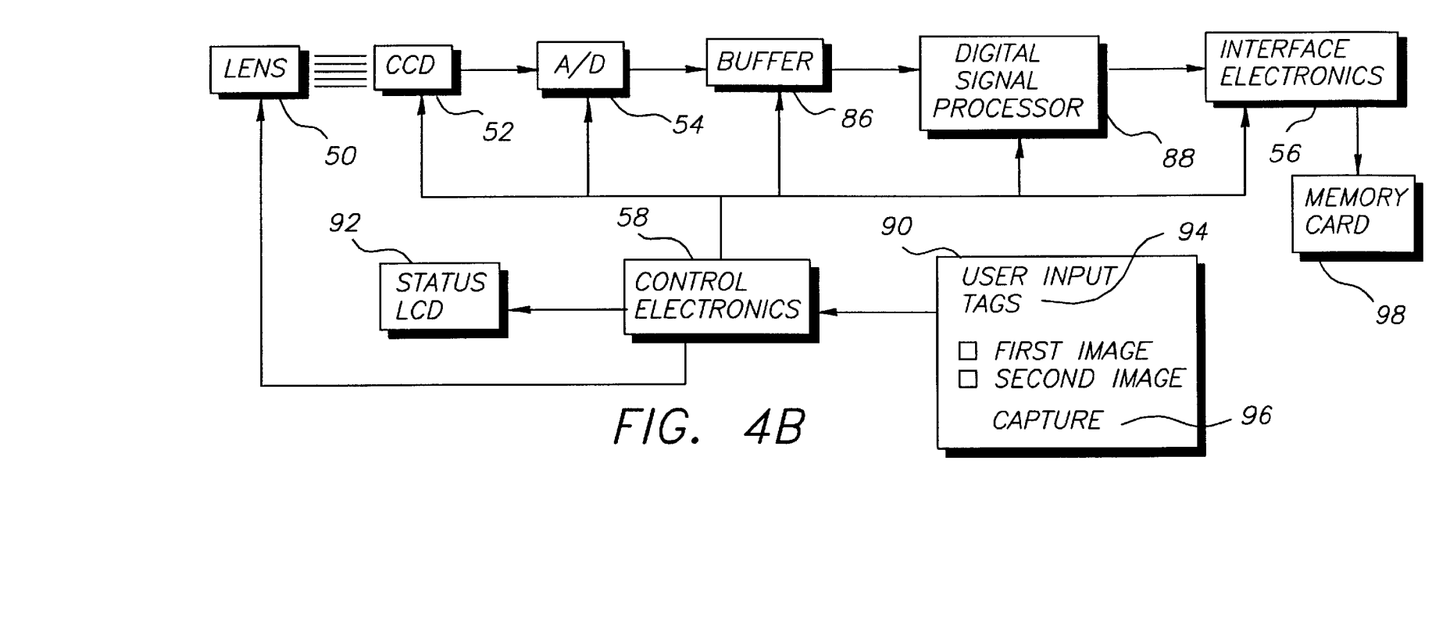

FIG. 3A, the tethered camera 40 is connected to a host computer 44 via an interface cable 46, which may utilize a conventional "Universal Serial Bus" (USB) interface, for example. The camera is stably mounted using a tripod 48 or other mount, and, as shown in FIG. 3B, includes a lens 50, a charge-coupled device (CCD) image sensor 52, an analog-to-digital (A/D) converter 54, an interface electronics section 56 to drive the USB interface, and a control electronics section 58 to drive the image sensor 52 and control the A/D 54 and the section 56. The control electronics section 58 also controls the exposure setting of the camera, e.g., by controlling an aperture in the lens 50 and the electronic shuttering of the image sensor 52. Power is supplied to the camera 40 from the computer via the USB cable 46. The user enables the compositing feature via a command from a keyboard 60 or a mouse 62. The computer 44 then commands the camera 40 to take the first picture 12, having a subject in front of any background. For best results, the background should be some distance behind the subject, so that the subject does not cast a deep shadow on the background. The subject and/or objects are then removed from the scene, and a second image 18 is taken, this time of only the background. The second image 18 may be taken automatically after some period of time (for example 10 seconds) or instead taken when the user provides another keyboard or mouse input command to the computer 44. The algorithm works best when the camera focus and exposure setting for the second exposure are the same as for the first exposure. This condition minimizes the difference of the image background between the two exposures. Although it is possible to have a different exposure setting for the second exposure and compensate for it, knowing the camera and system calibration, the procedure is simplified by keeping the exposure setting for the second exposure the same as the first. If the camera focus or exposure setting is not maintained, the change needs to be compensated before applying the following processing.

The two images are then processed by the computer 44 as shown in FIG. 2 and the composite image is displayed on a monitor 64 (FIG. 3A) or produced on a printer (not shown). During processing in the computer 44, the second image 18 is subtracted from the first image 12 in a differencing section 70 in order to generate a foreground mask image. (For further information about related differencing techniques, see, e.g., a doctoral dissertation of Michael Kelly located in the Stanford University library (*Visual Identification of People by Computer*, by Michael D. Kelly, Stanford University (computer science), Ph.D. thesis, 1970). Because the background areas are substantially the same in both images, the result should be an image that is approximately 0 in background areas where the desired subject was not present. Because the subject area is only found in the first image 12, the result should be an image that is generally non-zero in subject areas where the subject was present. However, all pixels in the background areas will not be exactly 0, since there will be some level of noise in the camera. Moreover, for certain subjects and backgrounds, some pixels in the differenced "subject" area may be approximately zero, if the brightness and color of these pixels in the subject and background are nearly identical. Therefore, additional processing steps are used to create a suitable foreground mask image. In particular, a noise reduction algorithm is used to reduce noise in the difference image.

As shown in FIG. 2, the additional processing steps generally include (for a generic example) processing the difference image by a look-up table (LUT) section 71 according to a table threshold as shown in a threshold diagram 72 in order to generate a binary mask image. (Furthermore, a threshold estimation section 73 automatically sets the proper threshold by measuring the noise of the channel using the captured images.) The output of the LUT may be processed by a median filter section 74, for example, to eliminate random noise in the background and the foreground. Finally, the user may optionally "clean up" any obvious holes in the foreground mask where the image value of the subject matched that of the background immediately behind that area of the image. This "clean up" operation is preferably done in a user section 76 with a user-controlled tool 78 that "paints" over any of the new background 80 that occurs inside the subject, or old background that occurs outside the subject.

Figure 5:
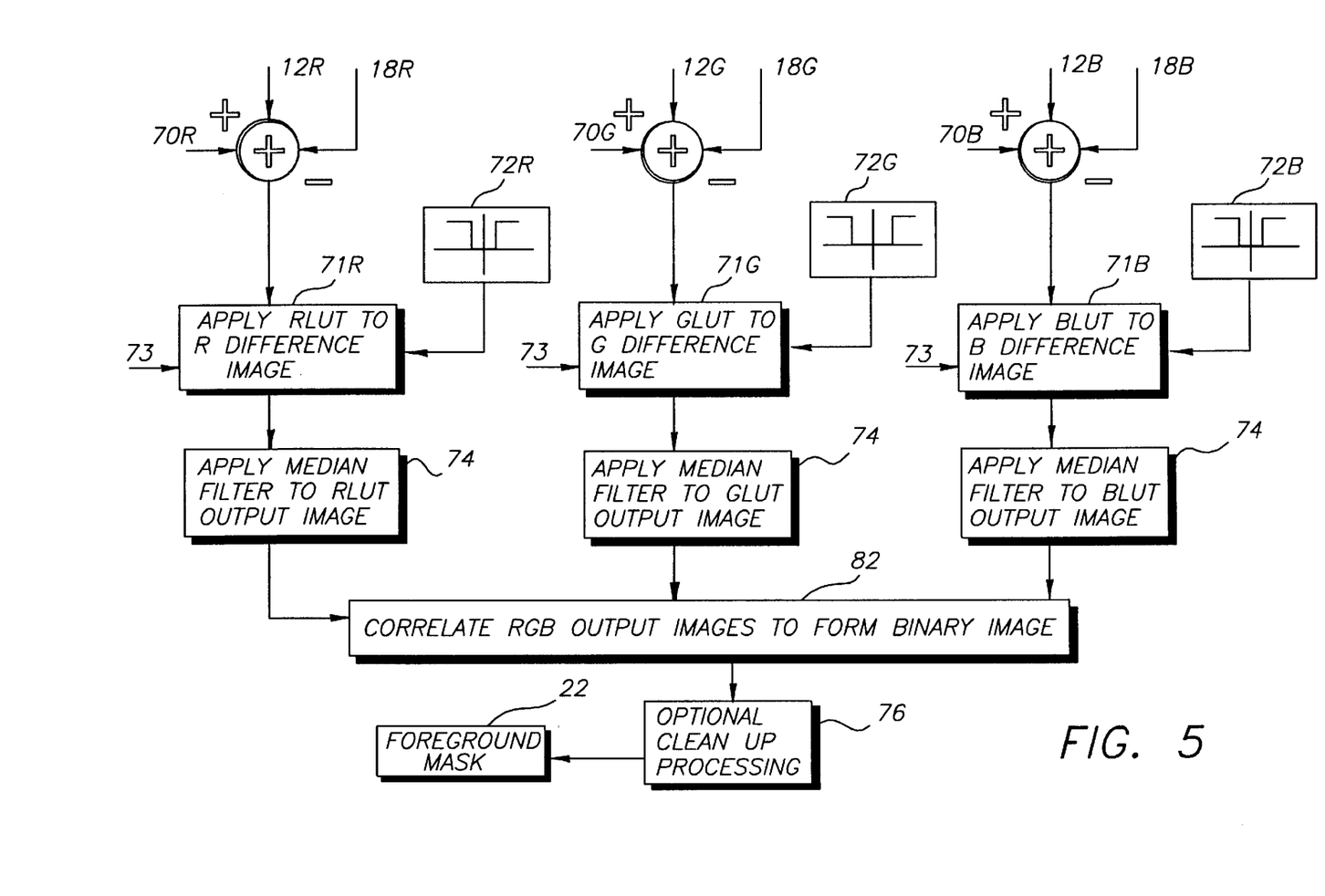
FIG. 5 shows a preferred technique for the foreground mask generation step shown in FIG. 2 specifically for color images.

For color images, certain parts of the processing shown in FIG. 2 are performed separately for each R,G,B color layer (record) composing the images 12 and 18. As shown in FIG. 5, the additional processing steps include processing the R, G, and B difference images by separate RGB lookup tables (LUT) 71R, 71G, and 71B according to separate table thresholds as shown in the separate threshold diagrams 72R, 72G, and 72B. Note that the exact threshold is preferably set differently for the red, green, and blue channels, since the noise levels of the three channels may be different. (As already shown in FIG. 2, the threshold estimation section 73 automatically sets the proper threshold; now, however, this is done for each color by measuring the noise of the three channels using the captured images.) The output of each LUT 71R, 71G, and 71B may be processed by separate median filter sections 74, for example, to eliminate random noise in the background. In a correlation section 82, the outputs of the median filter sections 74 are combined in an OR operation to form a single binary mask. In generating the binary image, if any of the three (RGB) color layers of the difference image are found to be significantly different from zero, the mask is set high (255), while if all three are nearly zero, the mask is set low (0). Finally, the user may optionally "clean up" any obvious holes in the foreground mask where the color of the subject matched that of the background immediately behind that area of the image. This "clean up" operation is preferably done in a user section 76 with a user-controlled tool 78 that "paints" over any of the new background 80 that occurs inside the subject.

This invention can also be applied to a portable digital camera 42 with removable memory, as shown in FIG. 4A, wherein elements already described in connection with FIG. 3A operate similarly and are given the same reference characters (albeit the interface electronics 56 is adapted to the particular storage interface used). The captured digital image is stored in a buffer memory 86 and then processed in a digital signal processor (DSP) 88, where information identifying the image can be attached to the image file. In particular, a user input control section 90 allows user input of tags that identify the captured image as either the first image 12 or the second image 18. The images may be taken by the camera 42 when the user has selected a composite feature 94 on a status liquid crystal display (LCD) 92 by using the user input controls 90. The user then actuates a shutter button 96, the camera 42 captures the selected picture, the DSP 88 appends the appropriate tags to the image files, and the image files (with tags) are stored in a removable memory card 98. The memory card 98 is then removed from a memory card slot 100 in the camera 42 and taken to the computer 44. When the card is inserted into a complementary memory card slot 102 in the host computer 44, the images are read out by the computer 44, the tags are accessed to identify the images, and the rest of the steps described in FIGS. 1, 2, and 5 are performed.

Alternatively, when the user has selected the compositing mode, the camera 42 may take the first image 12, e.g., ten seconds after the user presses the shutter button 96, and the second image 18, e.g., twenty seconds after the shutter button is pressed. The two images may then be automatically "tagged" by the DSP 88 as the first and second images of a composite set as the images are stored on the removable memory card 98 inserted in the memory card slot 100. Furthermore, the DSP 88 could be programmed to generate the foreground mask in the camera 42 using the process outlined in FIGS. 2 and 5, and the first image 12 and the foreground mask 22 could be stored (with associated tags indicating the first image and foreground mask) on the card, and later composited with a new background image on the host computer 44. In each implementation, the host computer 44 may store a library of background images for selection by the user (see step 30 in FIG. 1).

This technique can also be applied to a moving subject, as long as the camera itself does not move relative to the background. In this case, there will be many "first images" 12 ("Subject plus background" frames), and one second image 18 ("Background only" frame). In this embodiment, a camera such as described in FIG. 4A is driven to capture a motion sequence of first images 12, which are stored in a suitably enlarged buffer 86 until processed by the DSP 88 and tagged, e.g., to indicate the position of each image in the sequence. The first images 12 are stored in the memory card 98 along with a second image 18. (This embodiment may also be practiced with the tethered camera shown in FIG. 3A). In the computer 44, a foreground mask image 22 is created for each first image 12 ("Subject plus background" frame) by subtracting the second image 18 ("Background only" frame) and processing the results as described in FIGS. 1, 2 and 5. Alternately, the foreground mask 22 can be created for only an initial frame, or a number of "key" frames, and the mask for the other frames of the sequence can be calculated using well-known motion tracking algorithms.

Figure 6A:
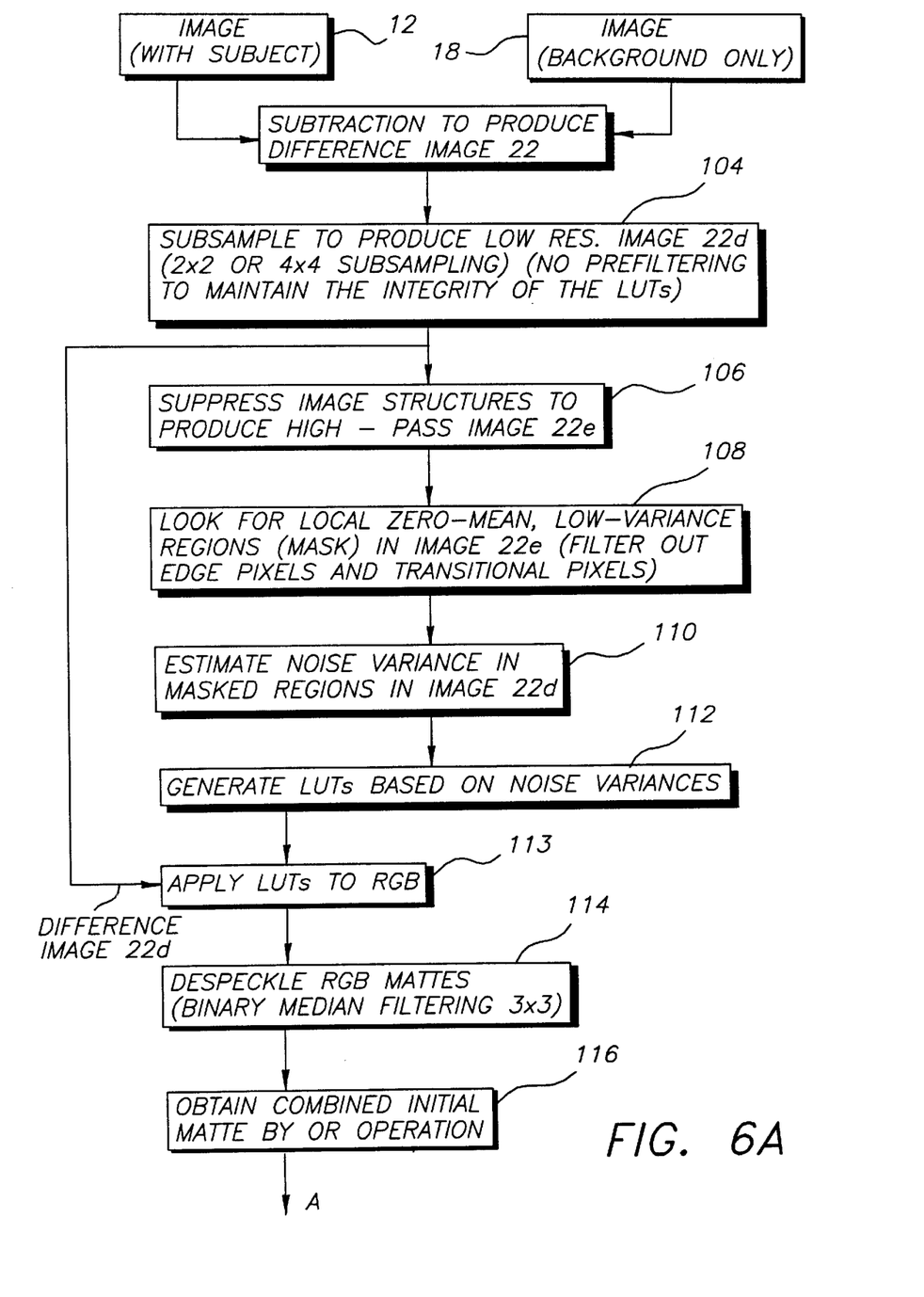
FIGS. 6A and 6B show further details of foreground mask generation, including a preferred technique for generating a set of lookup table thresholds based on noise estimation.
Figure 6B:
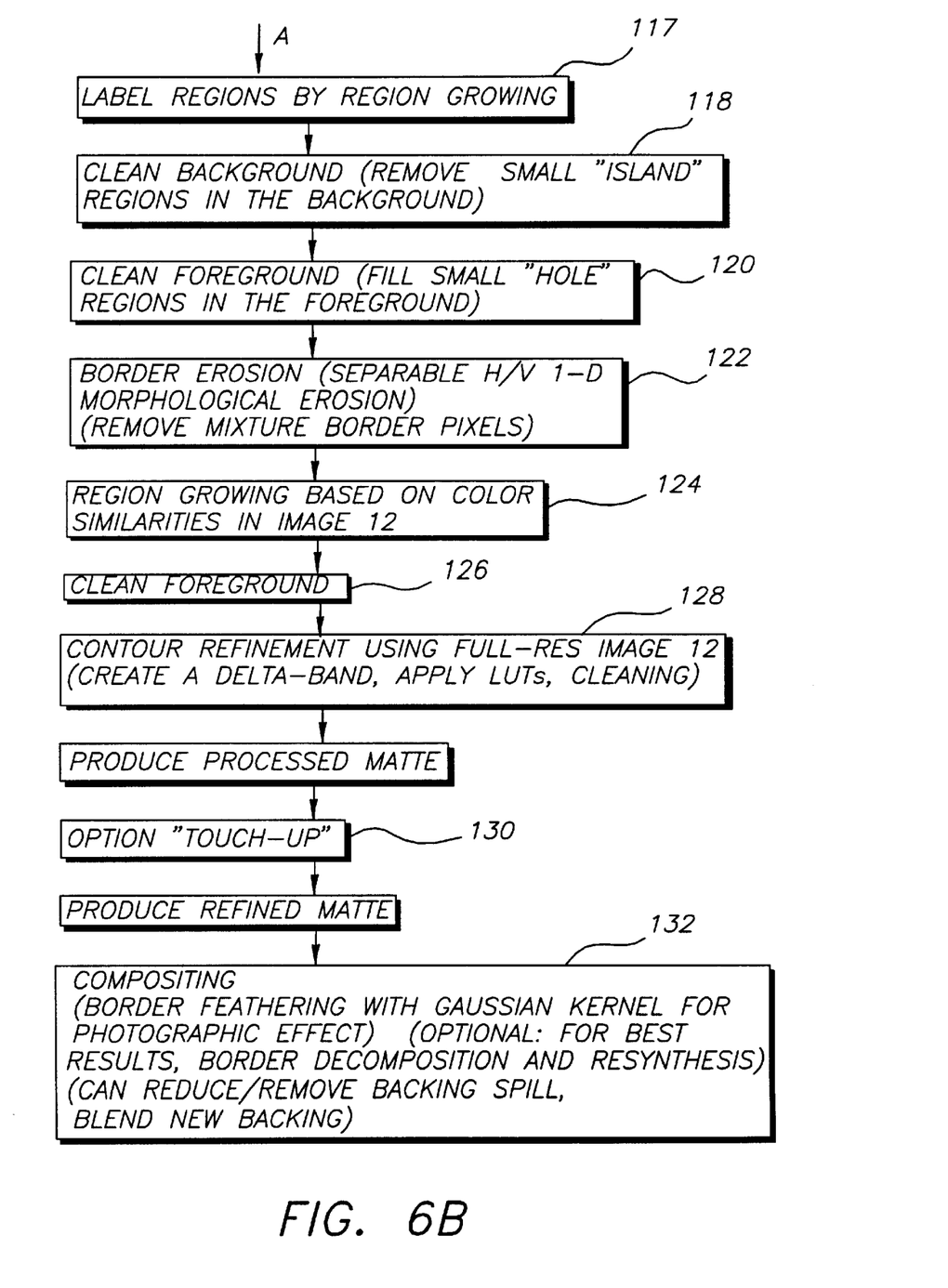

FIGS. 6A and 6B show a currently preferred technique for generating a set of lookup table thresholds based on noise estimation (i.e., the threshold estimation section shown in FIG. 2) and generating a refined foreground matte image by use of the lookup tables and additional techniques. Referring to steps in FIGS. 6A and 6B, the size of each difference image produced in the differencing section 70 (FIG. 2) or the separate differencing sections 70R, 70G and 70B (FIG. 5) is reduced to an image 22d by a subsampling without prefiltering process (step 104) to reduce the subsequent computation, and the remaining image structure is suppressed by using a smoothing kernal (step 106) to produce a high pass image 22e. Edge pixels and transitional pixels (high variance regions) are filtered out of the image 22e by finding local zero-mean, low-variance regions (step 108) and the noise variance in these low variance (masked) regions of the difference image 22d is then estimated (step 110).

Based on the estimated noise variance in each color layer, the individual thresholds for RGB (i.e., for the threshold diagrams 72R, 72G and 72B in FIG. 5) are set and the LUTs are generated (step 112). In practice, the thresholds are proportional to the magnitude of the noise variance, that is, a high variance indicates a higher threshold, and vice versa. At this point, the LUTs 71R, 71G and 71B are applied to the RGB difference images (step 113) and the difference images are median filtered (step 114) as shown in FIG. 5. The initial matte is generated by binarization in an OR operation (step 116). Then, small regions are deleted (step 118) and small holes are filled (step 120). This is done in a region growing step 117, which identifies any connected regions in the binary image. Basically, if small "island" regions with non-zero values are found floating in the background, they are changed to zero (step 118). If small regions with zero values are found in the foreground, they are set high (255) in step 120. In the boundary region between the foreground and the background, pixels are eroded (removed), essentially by cutting away a narrow strip of pixels (step 122), because they may be a mixture of foreground and background. Some pixels within this strip, however, are not mixtures; these pixels are distinguished by color similarities in the RGB images 12R, 12G and 12B and these areas are grown back.

(step 124). This step also helps in filling some holes due to lack of color differences in the difference image 22. After border erosion treatment (step 122) and region growing based on color similarities (step 124), small holes may reappear and the foreground is again cleaned (step 126) by repeating the steps 117–120.

Up to this point, the processing has been of the low resolution mask created in the step 104. In now converting back to a high resolution mask, ambiguities can develop in the boundary regions between foreground and background. These contour areas are refined using the full resolution image 12 and image 18 (step 128) by generating a band of boundary pixels (delta-band), applying the LUTs from the step 112 to the pixels in the delta-band, and then cleaning the region in the delta-band with a median filter. If necessary, a refined matte is then obtained by optional "touch-up" cleaning (step 130) using, e.g., a manual "touch-up" procedure from Adobe Photoshop?. The refined matte is then ready for compositing. (Additional border feathering and border decomposition and resynthesis can be applied to enhance border effects (step 132).)

The invention has been described with reference to a preferred embodiment. However, it will be appreciated that variations and modifications can be effected by a person of ordinary skill in the art without departing from the scope of the invention. For example, in all of the embodiments described, a number of instances of the second (background) image 18 may be captured and averaged in order to reduce the noise that is present in electronically captured images. Furthermore, while FIG. 1 shows that a new background selected from a group of stored background images (step 30) is input to the compositing step 26, the invention may be applied to the reprocessing of the foreground 12' and its recompositing into the original background 18 (or vice versa). For example, if the foreground 12' is underexposed relative to the background 18, the foreground is extracted according to the invention and processed to "improve" its appearance. Then the processed foreground is returned to the original background 18. Conversely, the original background 18 may be processed and recomposited with the original foreground 12'.

PARTS LIST

| | |
|---|---|
| 10 | step |
| 12 | first image |
| 12' | foreground image |
| 14 | step |
| 16 | step |
| 18 | second image |
| 20 | step |
| 22 | foreground mask |
| 24 | foreground mask generation step |
| 26 | compositing step |
| 28 | new background |
| 30 | step |
| 32 | composite image |
| 40 | tethered digital camera |
| 42 | digital camera with memory |
| 44 | host computer |
| 46 | interface cable |
| 48 | tripod |
| 50 | lens |
| 52 | image sensor |
| 54 | A/D converter |
| 56 | interface electronics section |
| 58 | control electronics section |
| 60 | keyboard |
| 62 | mouse |
| 70 | differencing section |
| 70R | red differencing section |

-continued

| | |
|---|---|
| 70G | green differencing section |
| 70B | blue differencing section |
| 71 | LUT section |
| 71R | red LUT |
| 71G | green LUT |
| 71B | blue LUT |
| 72 | threshold diagram |
| 73 | threshold estimation section |
| 74 | median filter section |
| 76 | user section |
| 78 | tool |
| 80 | new background (hole) |
| 82 | correlation section |
| 84 | |
| 86 | buffer memory |
| 88 | DSP |
| 90 | user input control section |
| 92 | status LCD |
| 94 | tags |
| 96 | capture button |
| 98 | memory card |
| 100 | memory card slot |
| 102 | memory card slot |
| 104–132 | steps |

What is claimed is:

1. An electronic imaging system including a portable electronic camera operable in a compositing mode and a separate processor for compositing images; the portable electronic camera comprising:

an image sensor for capturing a first image of a foreground subject and a background, and a second image of the background only, and for producing first and second image signals representative of the first and second captured images, respectively, when the portable electronic camera is operating in the compositing mode;

means for converting the first and second image signals to first and second digital image signals, respectively;

means for subtracting the first and second digital image signals to produce a difference image;

means for processing the difference image to produce a foreground mask image signal;

a removable memory;

means for providing a first tag to identify the first digital image signal and a second tag to identify the foreground mask image signal, and for automatically applying the first and second tags to the first digital image signal and the foreground mask image signal, respectively, to produce first and second image files, respectively; and means for storing the first and second image files in the removable memory, whereby the stored first and second image files are adapted to be subsequently used in the compositing of a new composite image; and the separate processor comprising:

means for receiving the removable memory and being responsive to the first and second tags for automatically accessing the first and second image files stored in the removable memory;

means for extracting a foreground subject image from the first image file;

means for selecting a different background image; and means for producing the composite image from the foreground subject image and the different background image.

2. An electronic imaging system as claimed in claim 1 wherein said camera captures a plurality of second images of the background and said system further includes means for averaging the plurality of second images in order to minimize noise in the background.

3. An electronic imaging system as claimed in claim 1 wherein said electronic camera captures color images each composed of separate color records, including a first color image of a subject plus background and a second color image of the background only, and said subtracting means subtracts the separate color records composing said first and second images to generate a difference image for each color record, and said processing means generates a foreground mask image for each color record.

4. The electronic imaging system as claimed in claim 1 wherein said processing means includes a noise reduction algorithm to reduce noise in the foreground mask image.

5. The electronic camera as claimed in claim 4 wherein the noise reduction algorithm includes a thresholding operation that is applied to image values in the difference image.

6. The electronic camera as claimed in claim 5 wherein the thresholding operation includes a threshold that is set to be a function of the noise in the difference image.

7. The electronic camera as claimed in claim 5 wherein the thresholding operation is stored in a lookup table.

8. The electronic imaging system as claimed in claim 7 wherein an output of the thresholding operation is applied to a despeckling filter to eliminate random noise in foreground mask image.

9. An electronic imaging system including a portable electronic camera operable in a compositing mode and a separate processor for compositing images; the portable electronic camera comprising:

an image sensor for capturing a first image of a foreground subject and a background, and a second image of the background only, and for producing first and second image signals representative of the first and second captured images, respectively, when the portable electronic camera is operating in the compositing mode;

means for converting the first and second image signals to first and second digital image signals, respectively;

a removable memory;

means for providing a first tag to identify the first digital image and a second tag to identify the second digital image, and for applying the first and second tags to the first and second digital images, respectively, to produce first and second image files, respectively; and means for storing the first and second image files in the removable memory, whereby the stored first and second image files are adapted to be subsequently used in the compositing of a new composite image; and the separate processor comprising:

means for receiving the removable memory and being responsive to the first and second tags for automatically accessing the first and second image files stored in the removable memory;

means for subtracting the first and second digital images to produce a difference image;

means for processing the difference image to produce a foreground mask image;

means responsive to the foreground mask image for extracting a foreground subject image from the first image file;

means for selecting a different background image; and means for producing the composite image from the foreground subject image and the different background image.

* * * * *